United States Patent
Rezaiifar et al.

(10) Patent No.: US 7,197,017 B1
(45) Date of Patent: Mar. 27, 2007

(54) METHOD AND APPARATUS FOR CHANNEL OPTIMIZATION DURING POINT-TO-POINT PROTOCOL (PPP) SESSION REQUESTS

(75) Inventors: Ramin Rezaiifar, San Diego, CA (US); Raymond Tah-Sheng Hsu, San Diego, CA (US); Nischal Abrol, San Diego, CA (US)

(73) Assignee: Qualcomm, Incorporated, San Diego, CA (US)

( * ) Notice: Subject to any disclaimer, the term of this patent is extended or adjusted under 35 U.S.C. 154(b) by 0 days.

(21) Appl. No.: 09/494,199

(22) Filed: Jan. 28, 2000

Related U.S. Application Data (63) Continuation-in-part of application No. 09/477,278, filed on Jan. 4, 2000.

(51) Int. Cl.
*H04Q 7/24* (2006.01)
(52) U.S. Cl. .................. 370/331; 370/338; 455/436
(58) Field of Classification Search ............. 370/328, 370/331, 338; 455/436, 437, 442
See application file for complete search history.

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,267,261 A | | 11/1993 | Blakeney, II et al. |
| 5,577,168 A | * | 11/1996 | Haas et al. ............. 455/443 |
| 5,761,618 A | * | 6/1998 | Lynch et al. ............ 455/436 |
| 5,774,805 A | * | 6/1998 | Zicker ..................... 455/426.1 |
| 6,167,260 A | * | 12/2000 | Azam et al. ............. 455/437 |
| 6,466,571 B1 | * | 10/2002 | Dynarski et al. ........ 370/352 |
| 6,496,491 B2 | * | 12/2002 | Chuah et al. ............ 370/331 |
| 6,765,909 B1 | * | 7/2004 | Sen et al. ................. 370/392 |

FOREIGN PATENT DOCUMENTS

| | | |
|---|---|---|
| EP | 0649267 A2 | 4/1995 |
| EP | 0912027 A2 | 4/1999 |
| WO | 01/50783 A2 | 7/2001 |
| WO | 01/67786 A2 | 9/2001 |

\* cited by examiner

*Primary Examiner*—Chau Nguyen
*Assistant Examiner*—Jordan Hamann
(74) *Attorney, Agent, or Firm*—Thomas R. Rouse; Thien T. Nguyen; Ramin Mobarhan (57) ABSTRACT

A method and apparatus for requesting PPP instances from a packet data services network includes a mobile station configured to send an origination message to a packet data service node (PDSN) at which it has arrived upon leaving the vicinity of another PDSN. The message informs the new PDSN of the new location of the mobile station and indicates both the number of dormant PPP instances associated with the mobile station and a service reference identifier for each such PPP instance. A flag within the message may be used to indicate whether the PPP instances are dormant (i.e., whether the mobile station is engaged in a call). Communications channel resources of packet data services nodes are optimized by reducing the information included in messages from the Packet Control Function network element to the Packet Data Service Node network element, and by reducing the use of Mobile Internet Protocol agent advertisement.

24 Claims, 6 Drawing Sheets

METHOD AND APPARATUS FOR CHANNEL OPTIMIZATION DURING POINT-TO-POINT PROTOCOL (PPP) SESSION REQUESTS

CROSS-REFERENCE TO RELATED APPLICATION

The present application is a continuation-in-part application of co-pending U.S. patent application Ser. No. 09/477,278, filed Jan. 4, 2000, entitled "METHOD AND APPARATUS FOR REQUESTING POINT-TO-POINT PROTOCOL (PPP) INSTANCES FROM A PACKET DATA SERVICES NETWORK".

BACKGROUND OF THE INVENTION

I. Field of the Invention

The present invention pertains generally to the field of communications, and more specifically to methods and apparatus for channel optimization during point-to-point protocol (PPP) session requests.

II. Background

With the increasing popularity of both wireless communications and Internet applications, a market has arisen for products and services that combine the two. As a result, various methods and systems are under development to provide wireless Internet services that would allow a user of a wireless telephone or terminal to access email, web pages, and other network resources. Because information on the Internet is organized into discrete "packets" of data, these services are often referred to as "packet data services."

Among the different types of wireless communication systems to be used to provide wireless packet data services are code division multiple access (CDMA) systems. The use of CDMA modulation techniques is one of several techniques for facilitating communications in which a large number of system users are present. The framing and transmission of Internet Protocol (IP) data through a CDMA wireless network is well known in the art and has been described in TIA/EIA/IS-707-A, entitled "DATA SERVICE OPTIONS FOR SPREAD SPECTRUM SYSTEMS," hereinafter referred to as IS-707.

Other multiple access communication system techniques, such as time division multiple access (TDMA), frequency division multiple access (FDMA), and AM modulation schemes such as amplitude companded single sideband (ACSSB) modulation are known in the art. These techniques have been standardized to facilitate interoperation between equipment manufactured by different companies. CDMA communications systems have been standardized in the United States in Telecommunications Industry Association TIA/EIA/IS-95-B, entitled "MOBILE STATION-BASE STATION COMPATIBILITY STANDARD FOR DUAL-MODE WIDEBAND SPREAD SPECTRUM CELLULAR SYSTEMS," hereinafter referred to as IS-95.

The International Telecommunications Union recently requested the submission of proposed methods for providing high-rate data and high-quality speech services over wireless communication channels. A first of these proposals was issued by the Telecommunications Industry Association, entitled "The cdma2000 ITU-R RTT Candidate Submission," and hereinafter referred to as cdma2000. A second of these proposals was issued by the European Telecommunications Standards Institute (ETSI), entitled "The ETSI UMTS Terrestrial Radio Access (UTRA) ITU-R RTT Candidate Submission," also known as "wideband CDMA," and hereinafter referred to as W-CDMA. A third proposal was submitted by U.S. TG 8/1, entitled "The UWC-136 Candidate Submission," hereinafter referred to as EDGE. The contents of these submissions are public record and are well known in the art.

Several standards have been developed by the Internet Engineering Task Force (IETF) to facilitate mobile packet data services using the Internet. Mobile IP is one such standard, and was designed to allow a device having an IP address to exchange data with the Internet while physically travelling throughout a network (or networks). Mobile IP is described in detail in IETF request for comments (RFC), entitled "IP Mobility Support," and incorporated by reference.

Several other IETF standards set forth techniques referred to in the above-named references. Point-to-Point Protocol (PPP) is well known in the art and is described in IETF RFC 1661, entitled "The Point-to-Point Protocol (PPP)" and published in July 1994, hereinafter referred to as PPP. PPP includes a Link Control Protocol (LCP) and several Network Control Protocols (NCP) used for establishing and configuring different network-layer protocols over a PPP link. One such NCP is the Internet Protocol Control Protocol (IPCP), well known in the art and described in IETF RFC 1332, entitled "The PPP Internet Protocol Control Protocol (IPCP)," published in May of 1992, and hereinafter referred to as IPCP. Extensions to the LCP are well known in the art and described in IETF RFC 1570, entitled "PPP LCP Extensions," published in January 1994, and hereinafter referred to as LCP.

Mobile stations, such as, e.g., cellular or PCS telephones with Internet connections, typically transmit packet data over a network by establishing a PPP connection (or PPP instance, or PPP session), with a packet data service node (PDSN). The mobile station sends packets across an RF interface such as, e.g., a CDMA interface, to a base station or packet control function. The base station or packet control function establishes the PPP instance with the PDSN. More than one such PPP instance may be established contemporaneously (e.g., if a phone and a laptop each require a connection). Data packets are routed from a foreign agent (FA) of the PDSN to a home agent (HA) via an IP network in accordance with the particular PPP instance. Packets being sent to the mobile station are routed from the HA via the IP network to the FA of the PDSN, from the FA of the PDSN to the base station or packet control function via the PPP instance, and from the base station or packet control function to the mobile station via the RF interface.

When a mobile station leaves the vicinity of a PDSN and enters the vicinity of another PDSN, the mobile station sends an origination message. If the mobile station is engaged in a data call, the origination message requests reconnection or establishment of the associated PPP instance. Otherwise, the origination message informs the new PDSN of the new location of the mobile station. Nevertheless, any data packets being sent to the mobile station will be routed to the old PDSN because the mobile station does not have a PPP instance established with the new PDSN. Accordingly, packets destined for the mobile station will become lost. Thus, there is a need for a method of informing a PDSN of the number and identities of PPP instances to be established for a newly arriving mobile station. There is also a need for a method of informing a PDSN of the number and identities of PPP instances to optimize the usage of Air Interface and radio access network (RAN) PDSN interface (RPI) communications channel resources.

SUMMARY OF THE INVENTION

The present invention is directed to a method of informing a PDSN of the number and identities of PPP instances to optimize the usage of air interface and radio access network (RAN) PDSN interface (RPI) communications channel resources. Accordingly, in one aspect of the invention, a method of informing a packet data services network of dormant network connections associated with a mobile station when the mobile station moves from a first infrastructure element of the packet data services network to a second infrastructure element of the packet data services network is provided. The method advantageously includes the step of transmitting from the mobile station a message including a number of dormant network connections associated with the mobile station and a list of identifiers associated with the dormant network connections.

In another aspect of the invention, a mobile station configured to inform a packet data services network of dormant network connections associated with the mobile station when the mobile station moves from a first infrastructure element of the packet data services network to a second infrastructure element of the packet data services network is provided. The mobile station advantageously includes an antenna; a processor coupled to the antenna; and a processor-readable medium accessible by the processor and containing a set of instructions executable by the processor to modulate and transmit from the mobile station a message including a number of dormant network connections associated with the mobile station and a list of identifiers associated with the dormant network connections.

In another aspect of the invention, a mobile station configured to inform a packet data services network of dormant network connections associated with the mobile station when the mobile station moves from a first infrastructure element of the packet data services network to a second infrastructure element of the packet data services network is provided. The mobile station advantageously includes a device configured to transmit from the mobile station a message including a number of dormant network connections associated with the mobile station and a list of identifiers associated with the dormant network connections.

In another aspect of the invention, a mobile station configured to inform a packet data services network of dormant network connections associated with the mobile station when the mobile station moves from a first infrastructure element of the packet data services network to a second infrastructure element of the packet data services network is provided. The mobile station advantageously includes means for transmitting from the mobile station a message including a number of dormant network connections associated with the mobile station and a list of identifiers associated with the dormant network connections.

In another aspect of the invention, a method of optimizing the RPI communications channel resources in a communications network when the mobile station moves from a first infrastructure element of the packet data services network to a second infrastructure element of the packet data services network is provided. The method advantageously contains the step of transmitting from the packet control function, or base station, a message including a number of dormant network connections associated with the mobile station and a reduced list of identifiers associated with the dormant network connections.

In another aspect of the invention, a method of simplifying Packet Control Function network element functionality when a mobile station moves from a first infrastructure element of the packet data services network to a second infrastructure element of the packet data services network is provided. The method advantageously contains the step of maintaining a reduced entry PPP connection table.

In another aspect of the invention, a method of optimizing the Air Interface traffic channel resources of a communications network when a mobile station moves from a first infrastructure element of the packet data services network to a second infrastructure element of the packet data services network is provided. The method advantageously contains the step of transmitting from the mobile station a message including a number of dormant network connections associated with the mobile station and enhanced information associated with the dormant network connections.

DETAILED DESCRIPTION OF THE PREFERRED EMBODIMENTS

Figure 1:
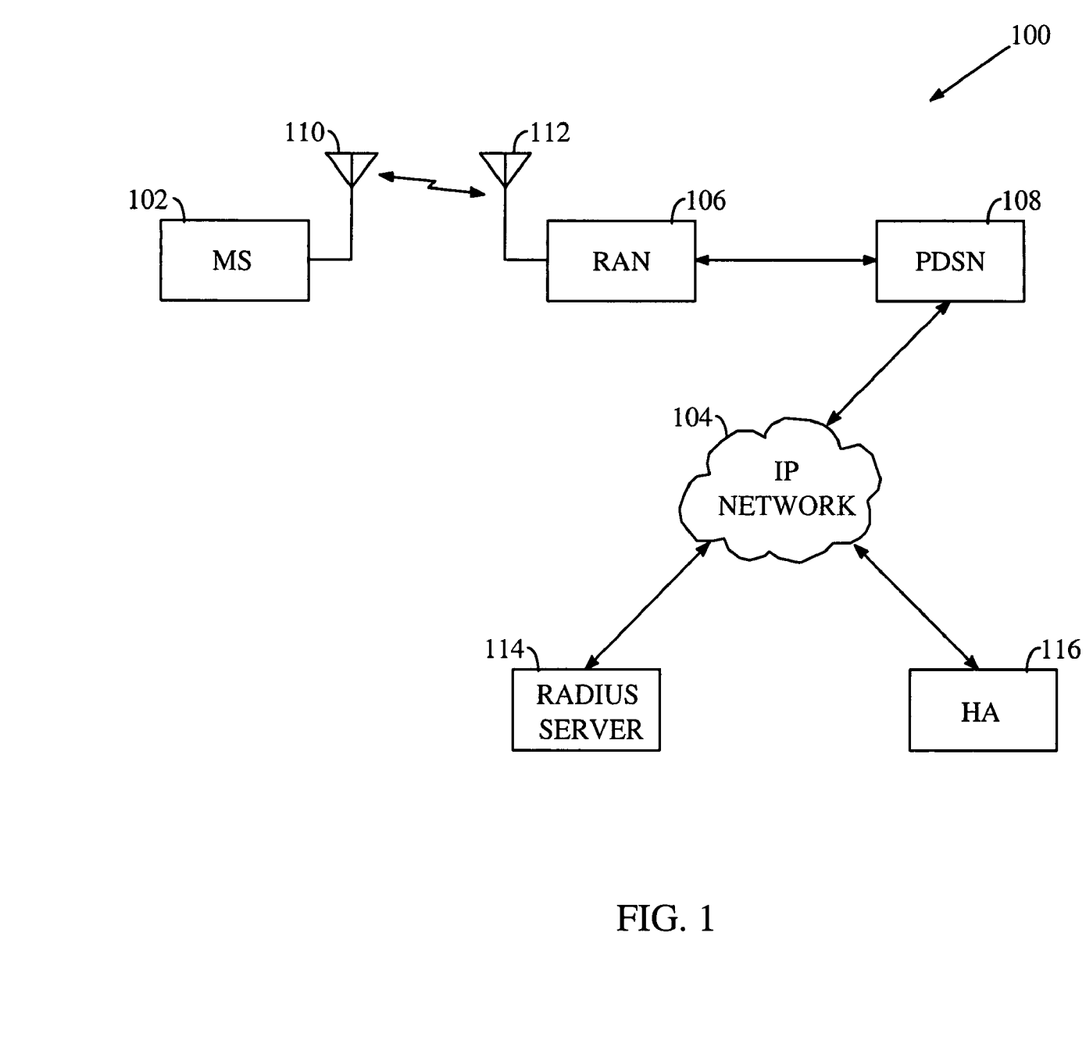
FIG. 1 is a block diagram of a wireless communication system configured to perform packet data networking.

In one embodiment a wireless communication system 100 for performing packet data networking includes the elements shown in FIG. 1. A mobile station (MS) 102 is advantageously capable of performing one or more wireless packet data protocols. In one embodiment the MS 102 is a wireless telephone running an IP-based Web-browser application. In one embodiment the MS 102 is not connected to any external device, such as a laptop. In an alternative embodiment, the MS 102 is a wireless telephone that is connected to an external device, wherein a protocol option is used that is equivalent to the Network Layer $R_m$ Interface Protocol Option described in IS-707. In another alternative embodiment, the MS 102 is a wireless telephone that is connected to an external device, wherein a protocol option is used that is equivalent to the Relay Layer $R_m$ Interface Protocol Option described in the aforementioned IS-707.

In a particular embodiment, the MS 102 communicates with an Internet Protocol (IP) network 104 via wireless communications with a radio access network (RAN) 106. The MS 102 generates IP packets for the IP network 104 and encapsulates the IP packets into frames destined for a Packet Data Serving Node (PDSN) 108. In one embodiment the IP packets are encapsulated using a point-to-point protocol (PPP) and the resultant PPP byte stream is transmitted through a code division multiple access (CDMA) network using a Radio Link Protocol (RLP).

The MS 102 sends the frames to the RAN 106 by modulating and transmitting the frames through an antenna 110. The frames are received by the RAN 106 through an antenna 112. The RAN 106 sends the received frames to the PDSN 108, at which the IP packets are extracted from the received frames. After the PDSN 108 extracts the IP packets from the data stream, the PDSN 108 routes the IP packets to the IP network 104. Conversely, the PDSN 108 can send encapsulated frames through the RAN 106 to the MS 102.

In one embodiment the PDSN 108 is coupled to a Remote Authentication Dial In User Service (RADIUS) server 114 for authenticating the MS 102. The PDSN 108 is also coupled to a Home Agent (HA) 116 for supporting the Mobile IP protocol. The HA 116 advantageously includes entities capable of authenticating the MS 102 and for granting the MS 102 the use of an IP address when Mobile IP is to be used. One skilled in the art would recognize that the RADIUS server 114 could be replaced with a DIAMETER server or any other Authentication, Authorization, and Accounting (AAA) server. In one embodiment the MS 102 generates IP packets, and the PDSN 108 is coupled to the IP network 104. One skilled in the art would recognize that alternate embodiments could use formats and protocols other than IP. In addition, the PDSN 108 may be coupled to a network capable of employing protocols other than IP.

In one embodiment the RAN 106 and the MS 102 communicate with each other using wireless spread spectrum techniques. In a particular embodiment, the data is wirelessly transmitted using CDMA multiple access techniques, as described in U.S. Pat. Nos. 5,103,459 and 4,901,307, which are assigned to the assignee of the present invention and fully incorporated herein by reference. One skilled in the art would recognize that the methods and techniques described herein may be used in conjunction with several alternate modulation techniques, including TDMA, cdma2000, W-CDMA, and EDGE.

In one embodiment the MS 102 has the ability to perform RLP, PPP, Challenge Handshake Authentication Protocol (CHAP), and Mobile IP. In a particular embodiment, the RAN 106 communicates with the MS 102 using RLP.

In one embodiment the PDSN 108 supports PPP functionality, including Link Control Protocol (LCP), CHAP, and the PPP Internet Protocol Control Protocol (IPCP). In one embodiment the PDSN 108, RADIUS server 114, and HA 116 are physically located in different physical devices. In an alternate embodiment, one or more of these entities can be located in the same physical device.

Figure 2:
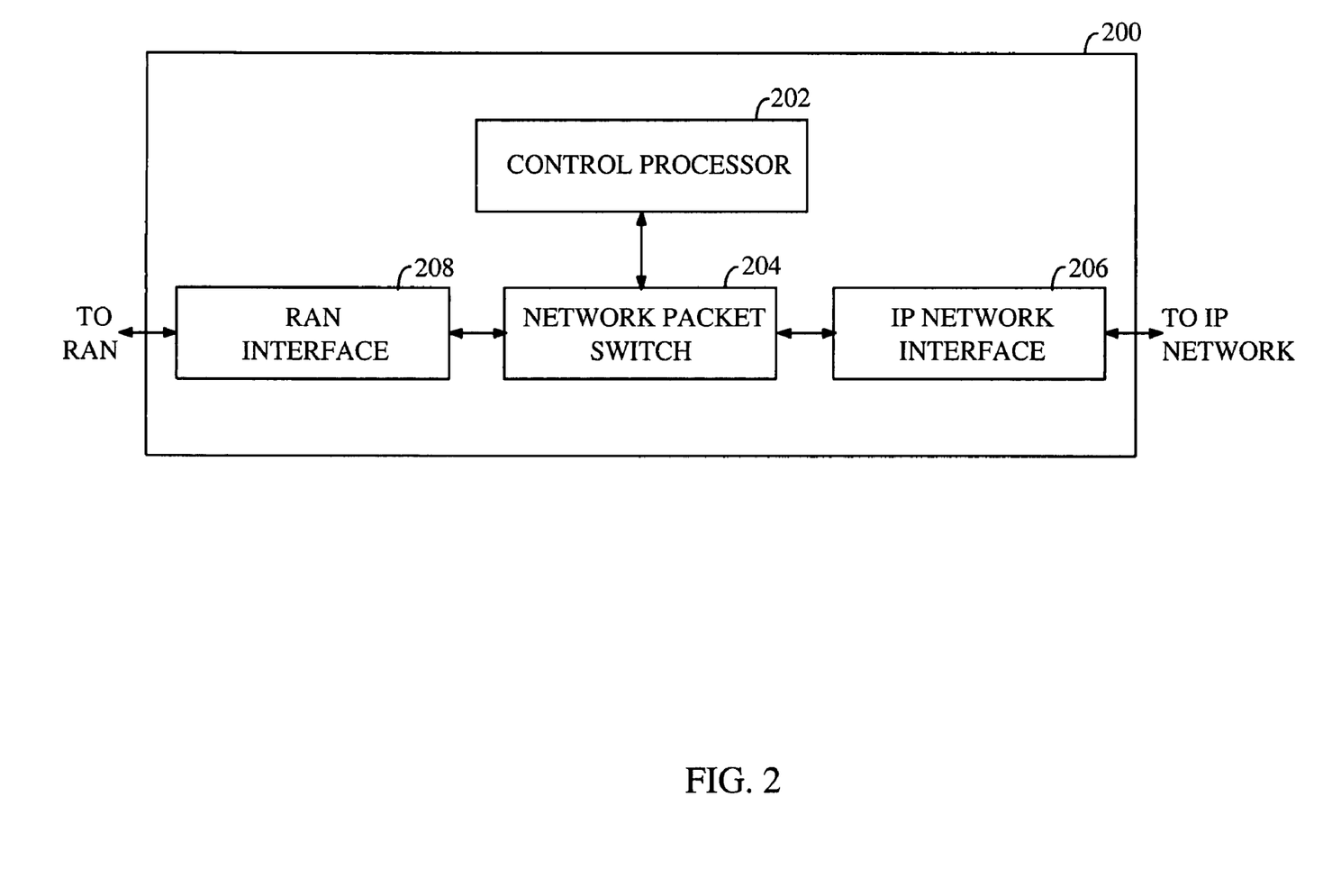
FIG. 2 is a block diagram of a packet data service node (PDSN).

In one embodiment PDSN 200 includes a control processor 202, a network packet switch 204, an IP network interface 206, and an RAN interface 208, as shown in FIG. 2. The IP network interface 206 is coupled to the network packet switch 204. The network packet switch 204 is coupled to the control processor 202 and to the RAN interface 208. The RAN interface 208 receives data packets from an RAN (not shown). The RAN interface 208 receives the packets over a physical interface. In one embodiment the physical interface is T3, a standard digital telecommunications interface that has a forty-five Mbps transfer rate. The physical T3 interface could be replaced with a T1 interface, an Ethernet interface, or any other physical interface used for data networking.

The RAN interface 208 delivers the received packets to the network packet switch 204. In an exemplary embodiment, the connection between the network packet switch 204 and the RAN interface 208 comprises a memory bus connection. The connection between the RAN interface 208 and the network packet switch 204 could be an Ethernet or any other of a variety of communications links that are well known in the art. The RAN interface 208 is also advantageously capable of receiving packets from the network packet switch 204 over the same connection and transmitting the packets to the RAN.

The network packet switch 204 is advantageously a configurable switch that is capable of routing packets between a variety of interfaces. In one embodiment the network packet switch 204 is configured such that all packets received from the RAN interface 208 and the IP network interface 206 are routed to the control processor 202. In an alternate embodiment, the network packet switch 204 is configured such that a subset of received frames from the RAN interface 208 are delivered to the IP network interface 206 and a remaining subset of received frames from the RAN interface 208 are delivered to the control processor 202. In one embodiment the network packet switch 204 delivers packets to the control processor 202 via a shared memory bus connection. The connection between the RAN interface 208 and the network packet switch 204 could be an Ethernet or any other of a variety of well known types of communications links. While the network packet switch 204 is coupled to the RAN interface 208 and the IP network interface 206, one skilled in the art would appreciate that the network packet switch 204 could be coupled to a smaller or larger number of interfaces. In an embodiment in which the network packet switch 204 is coupled to a single network interface, that network interface is coupled to both an IP network (not shown) and an RAN. In an alternate embodiment, the network packet switch 204 is incorporated into the control processor 202 such that the control processor 202 communicates directly with the network interface(s).

The control processor 202 exchanges information packets with the RAN interface 208 when a connection with an MS (not shown) is desired. After the control processor 202 receives an information packet indicating that a connection with an MS is desired, the control processor 202 negotiates a PPP session with the MS. To negotiate the PPP session, the control processor 202 generates PPP frames and sends the PPP frames to the RAN interface 208, and then interprets responses from the MS received from the RAN interface 208. The types of frames generated by the control processor 202 include LCP frames, IPCP frames, and CHAP frames. The MS may be authenticated in accordance with a method described in a U.S. application filed Dec. 3, 1999, U.S. patent application Ser. No. 09/453,612, entitled METHOD AND APPARATUS FOR AUTHENTICATION IN A WIRELESS TELECOMMUNICATIONS SYSTEM, assigned to the assignee of the present invention, and fully incorporated herein by reference.

The control processor 202 generates packets for exchange with AAA servers (not shown) and Mobile IP Has (also not shown). Additionally, for each established PPP session, the control processor 202 encapsulates and unencapsulates IP packets. One skilled in the art would recognize that the control processor 202 may be implemented using field-programmable gate arrays (FPGAs), programmable logic devices (PLDs), digital signal processors (DSPs), one or more microprocessors, an application specific integrated circuit (ASIC), or any other device capable of performing the PDSN functions described above.

In one embodiment the packets are delivered to the network packet switch 204, which, in turn, delivers the packets to the IP network interface 206 for delivery to the IP network. The IP network interface 206 transmits the packets over a physical interface. In one embodiment the physical interface is T3, a standard digital telecommunications interface that has a forty-five Mbps transfer rate. The physical T3 interface could be replaced with a T1 interface, an Ethernet interface, or any other physical interface used for data networking. The IP network interface 206 is also advantageously capable of receiving packets over the same physical interface.

Figure 3A:
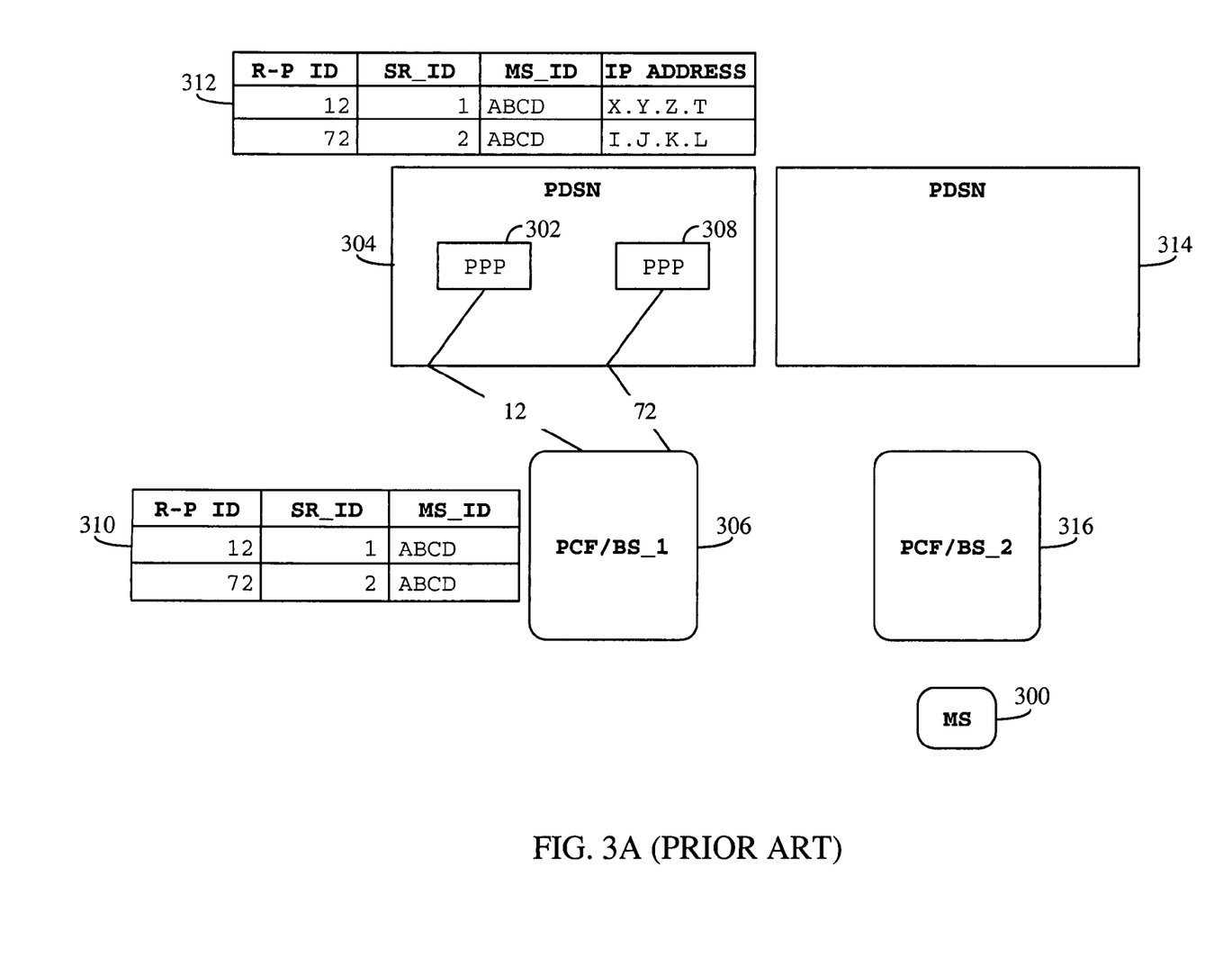
FIG. 3A is a block diagram of two PDSNs coupled to radio access networks (RANs) wherein a mobile station (MS) has traveled to the vicinity of the second PDSN without establishing new PPP instances.

An MS 300 transmits packet data over an IP network (not shown) by establishing a PPP instance 302 with a PDSN 304, as shown in FIG. 3A. The MS 300 sends packets across an RF interface such as, e.g., a CDMA interface, to a packet control function or base station (PCF/BS) 306. The PCF/BS 306 establishes the PPP instance 302 with the PDSN 304. Another PPP instance 308 may be established contemporaneously (e.g., if a phone and a laptop each require a connection). Data packets are routed from the PDSN 304 to an HA (not shown) via an IP network (also not shown) in accordance with the particular PPP instance 302, 308. Packets being sent to the MS 300 are routed from the HA via the IP network to the PDSN 304, from the PDSN 304 to the PCF/BS 306 via the PPP instance 302, 308, and from the PCF/BS 306 to the MS 300 via the RF interface. The PCF/BS 306 includes a PCF/BS table 310. The PCF/BS table 310 includes a list of MS identifiers (MS_IDs), service reference identifiers (SR_IDs), and RAN-to-PDSN interface (R-P) identifiers (R-P IDs). The PDSN 304 includes a PDSN table 312. The PDSN table 312 includes a list of IP addresses, MS_IDs, SR_IDs, and R-P IDs. The PDSN 304 may be served by more than one PCF/BS 306, but for simplicity only one PCF/BS 306 is shown coupled to the PDSN 304.

While the MS 300 is idle (i.e., not engaged in a telephone call), the MS 300 sends short data bursts as PPP frames. Each such PPP frame includes an SR_ID that identifies which PPP instance 302, 308 is to be the destination for the PPP frame. As understood by those of skill in the art, the PPP frames encapsulate other protocols. In an exemplary embodiment, the PPP frame encapsulates a Transport Control Protocol (TCP) frame and identifies the protocol of the encapsulated TCP frame. The TCP frame encapsulates an IP frame and identifies the protocol of the IP frame. The IP frame encapsulates a frame such as an RLP frame and also includes a source header and a destination header. The RLP frame may encapsulate a data frame configured in accordance with, e.g., IS-95B.

When the MS 300 leaves the vicinity of the PDSN 304 and enters the vicinity of another PDSN 314, the MS 300 sends an origination message. If the MS 300 is engaged in a data call, the call is "handed off" from the first PCF/BS 306 to a second PCF/BS 316 coupled to the second PDSN 314. An exemplary handoff procedure is described in U.S. Pat. No. 5,267,261, which is assigned to the assignee of the present invention and fully incorporated herein by reference. The MS 300 then sends an origination message informing the second PDSN 324 of its new location and requesting the establishment or reconnection of the PPP instance associated with the call. Otherwise, the PPP instances 302, 308 are "dormant" and the MS 300 performs a dormant handoff and then sends an origination message that informs the second PDSN 314 of the new location of the MS 300. It would be understood by those of skill that the second PDSN 314 may also be served by more than one PCF/BS 316, but for simplicity only one PCF/BS 316 is shown coupled to the PDSN 314. Although the network has been informed of the new location of the MS 300, the MS 300 requires that two new PPP instances be initiated (because the MS 300 has two dormant SR_IDs pertaining to the dormant PPP service instances 302, 308). The new PCF/BS 316 and PDSN 306 do not have tables listing SR_IDs or R-P IDs because the two necessary PPP instances have not been established. Accordingly, data packets being sent to the MS 300 will be routed to the first PDSN 304 because the MS 300 does not have a PPP instance established with the new PDSN 314. Hence, packets destined for the MS 300 will become lost.

Figure 3B:
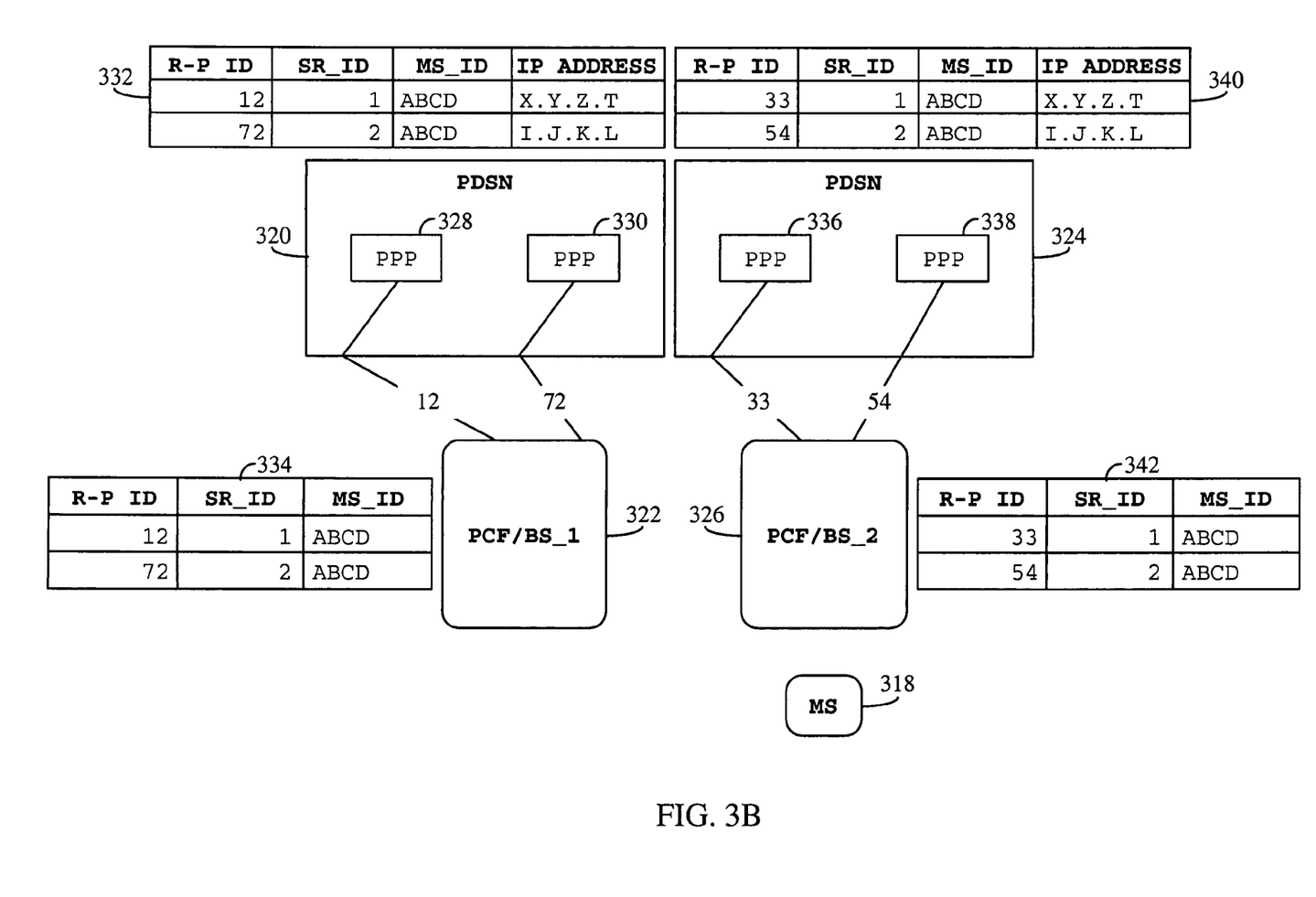
FIG. 3B is a block diagram of two PDSNs coupled to RANs wherein an MS has traveled to the vicinity of the second PDSN and established new PPP instances.

In one embodiment, as shown in FIG. 3B, an MS 318 travels from the vicinity of a first PDSN 320 and associated PCF/BS 322 to the vicinity of a second PDSN 324 and associated PCF/BS 326 and informs the second PDSN 324 of the number and identities of PPP instances that must be established. The first PDSN 320 had established two PPP instances 328, 330 between the PDSN 320 and the PCF/BS 322, which were dormant (i.e., not being used to transmit traffic channel data). The various established connections and addresses are included in the respective tables 332, 334 for the PDSN 320 and the PCF/BS 322. The number (two) of, and identifiers for, two newly required PPP instances 336, 338 are advantageously included in the origination message transmitted by the MS 318. For simplicity, only one PCF/BS 322, 326 is shown serving each respective PDSN 320, 324, but it would be understood that there could be multiple PCF/BSs serving each PDSN 320, 324. The origination message advantageously includes a Data-Ready-to-Send (DRS) flag that may be set to zero to identify to the PDSN 324 the identity and total number of packet services that are dormant, thereby allowing the PDSN 324 to establish PPP instances 336, 338 and the requisite R-P links between the PDSN 324 and the PCF/BS 326. If a data call is in progress, the MS 318 sets the DRS flag to one and requests reconnection or establishment of the PPP instance 328, 330 associated with the call. If no call is in progress, the MS 318 sets the DRS flag is set to zero and reports the SR_IDs for all dormant PPP service instances 328, 330 (SR_IDs 1 and 2) associated with the MS 318. The PCF/BS 326 then sends a message to the PDSN 324 that includes the list of SR_IDs and the MS_ID. The PDSN 324 establishes two PPP instances 336, 338 and two (the number of SR_IDs reported by the MS 318) R-P connections. The PDSN 324 and the PCF/BS 326 then update their respective tables 340, 342. Thus, the list of dormant SR_IDs informs the PDSN 324 how many PPP instances 336, 338 need to be initiated and also gives the PCF/BS 326 enough information to update its R-P/SR_ID table 342.

Figure 3C:
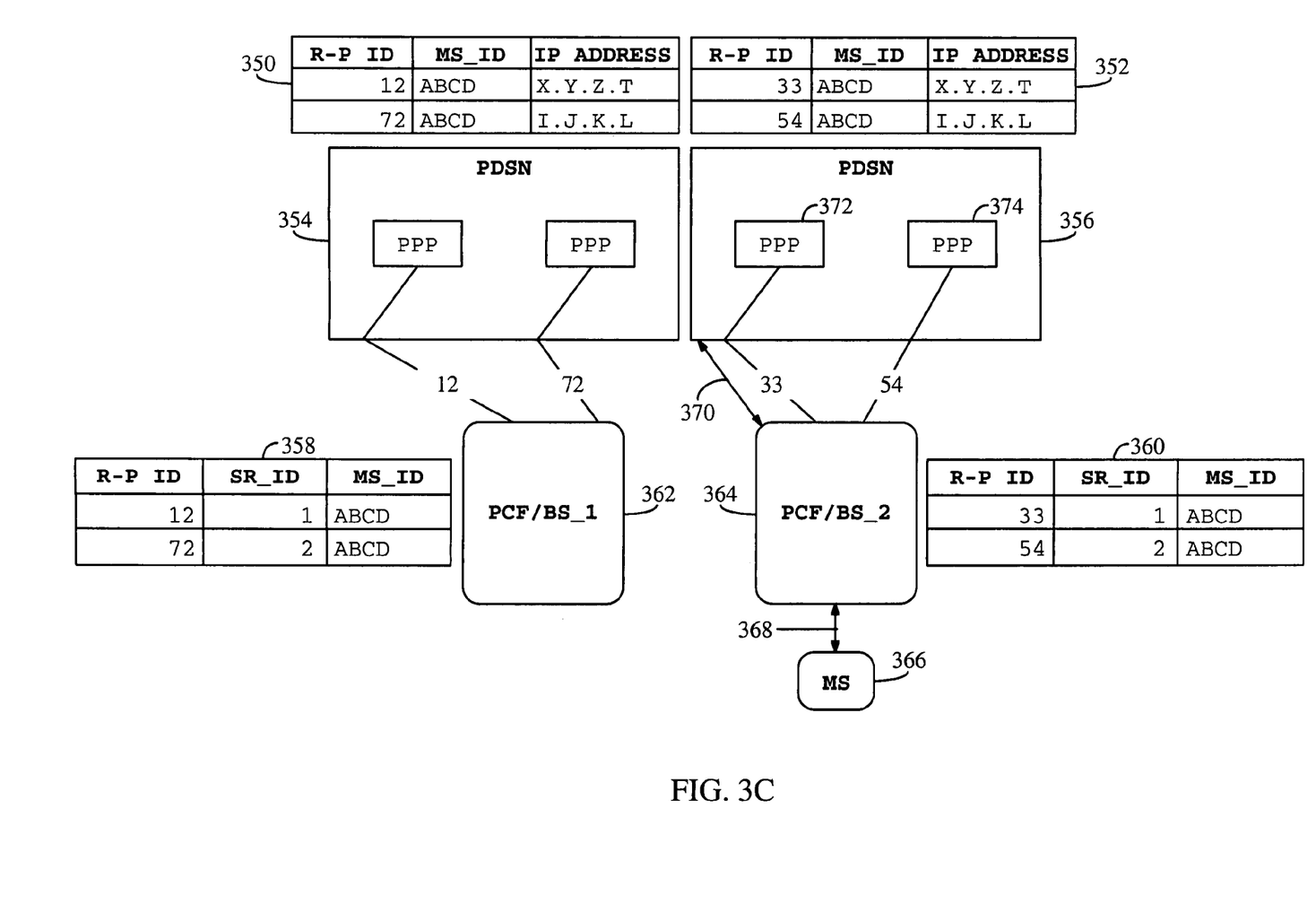
FIG. 3C is a block diagram of two PDSNs coupled to RANs wherein Air Interface and RPI channel optimization is illustrated.

In one embodiment, as shown in FIG. 3C, RPI channel 370 usage is optimized by reducing the information included in the message a PCF/BS 364 sends to a PDSN 356 when a MS 366 travels into the vicinity of the PDSN 356 and an associated PCF/BS 364. The information is reduced by eliminating the list of SR_IDs from the message, and the connection table 352 maintained by the PDSN 356. Rather than identifying packets associated with the new MS 366 to PPP instances 372,374 by SR_ID, the PCF/BS 364 associates packets to PPP instances 372,374 using the ordered pipe numbers of RPI communications pipes 33,54. The PCF/BS 364 associates the MS 366 packets with the lowest SR_ID to the lowest numbered data pipe, continuing the connections in ascending numerical order. In addition to optimizing RPI channel usage, PDSN functionality which currently does not maintain SR_ID information is simplified.

In another embodiment, as shown in FIG. 3C, Air Interface 368 usage is optimized by conserving Air Interface traffic channel communications when agent advertisement by the PDSN 356 is not necessary. Agent advertisement is the HA notification of a new FA IP address by the new FA (not shown). When a MS 366 moves to the vicinity of a new PDSN 356, the MS FA must also move to the new PDSN 356 so that packets forwarded from the HA (not shown) will reach the new PDSN 356. When the MS 366 changes FAs, the new FA notifies the HA to discontinue directing packets associated with the MS 366 to the old FA and instead direct them to the new FA. Agent advertisement occurs when a MS 366 moves to a new PCF/BS (or RAN) 364. When the MS 366 enters a new packet zone, the MS issues an origination message containing a PACKET_ZONE_ID to the PDSN 356 associated with the new PCF/BS 364. Agent advertisement triggers Mobile IP re-registration and PPP re-negotiation over the traffic channel. However, multiple PCF/BSs may be associated with the same PDSN 356, and Mobile IP re-registration and PPP re-negotiation are not necessary if the MS 366 has changed packet zones but not PDSNs. The PPP point of attachment and FA address do not change if a MS 366 moves from one PCF/BS to another PCF/BS associated with the same PDSN 356.

Air Interface traffic channel usage is optimized if a MS 366 had changed PCF/BSs but not PDSNs by adding old PACKET_ZONE_ID information to the MS origination message. The new PCF/BS 364 sends the old PACKET_ZONE_ID information to the associated PDSN 356. The PDSN 356 then determines if the MS 366 has moved from a RAN or PCF/BC 364 also connected to the PDSN 356. If the old RAN or PCF/BS is also connected to the PDSN 356, the PDSN 356 does not bring up the traffic channel to perform agent advertisement, as the MS PPP session is still established. Inclusion of old packet zone information in the MS origination message optimizes traffic channel usage by allowing the PDSN 356 to decide if it is necessary to bring up the traffic channel to renegotiate PPP.

In cases (not shown) where the old PCF/BS is connected to the same PDSN as the new PCF/BS, the new PCF/BS informs the PDSN of the previous connection, allowing the new PCF/BS to make a new connection to the already established PPP session.

Figure 4:
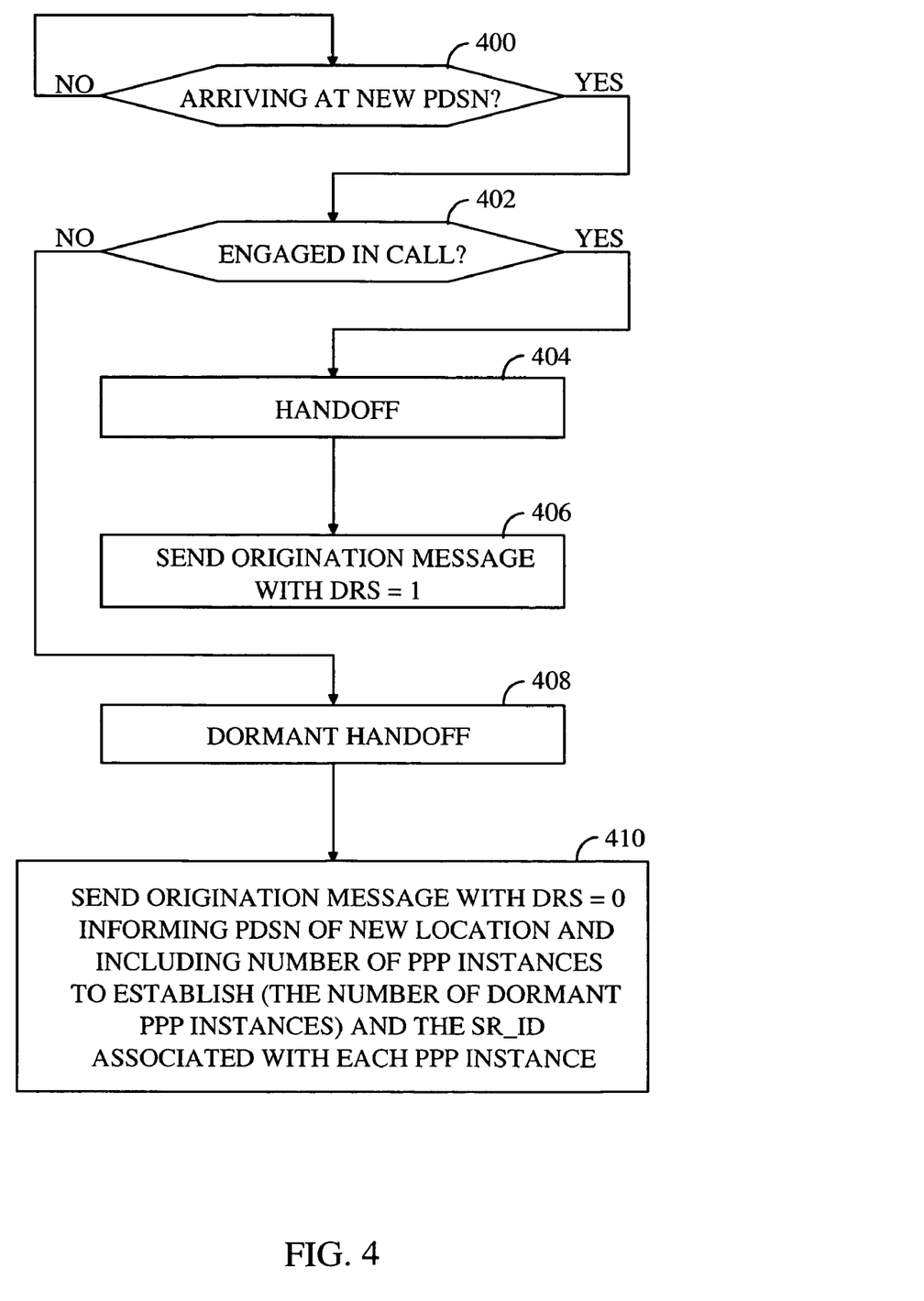
FIG. 4 is a flow chart illustrating method steps performed by a mobile station to inform a PDSN of the number and identities of PPP instances required to be established.

In one embodiment an MS (not shown) performs the method steps illustrated in FIG. 4 when leaving the vicinity of a PDSN (also not shown) and entering the vicinity of a neighboring PDSN (also not shown). In step 400 the MS determines whether it is arriving at a new PDSN. If the MS is not arriving at a new PDSN, the MS returns to step 400. If, on the other hand, the MS is arriving at a new PDSN, the MS proceeds to step 402. In step 402 the MS determines whether it is engaged in a data call. If the MS is engaged in a data call, the MS proceeds to step 404. If, on the other hand, the MS is not engaged in a data call, the MS proceeds to step 408.

In step 404 the MS engages in handoff. The MS then proceeds to step 406. In step 406 the MS sends an origination message to the new PDSN informing the PDSN of its location. A DRS flag in the origination message is set to one, and the MS is requesting reconnection or establishment of a PPP instance associated with the data call. In step 408 the MS engages in dormant handoff. The MS then proceeds to step 410. In step 410 the MS sends an origination message to the new PDSN informing the PDSN of its location. The DRS flag in the origination message is set to zero, and the MS includes the number of PPP instances to establish (the number of dormant PPP instances associated with the MS) and an SR_ID associated with each such PPP instance.

Thus, a novel and improved method and apparatus for channel optimization during PPP session requests have been described. Those of skill in the art would understand that the various illustrative logical blocks, modules, circuits, and algorithm steps described in connection with the embodiments disclosed herein may be implemented as electronic hardware, computer software, or combinations of both. The various illustrative components, blocks, modules, circuits, and steps have been described generally in terms of their functionality. Whether the functionality is implemented as hardware or software depends upon the particular application and design constraints imposed on the overall system. Skilled artisans recognize the interchangeability of hardware and software under these circumstances, and how best to implement the described functionality for each particular application. As examples, the various illustrative logical blocks, modules, circuits, and algorithm steps described in connection with the embodiments disclosed herein may be implemented or performed with a digital signal processor (DSP), an application specific integrated circuit (ASIC), a field programmable gate array (FPGA) or other programmable logic device, discrete gate or transistor logic, discrete hardware components such as, e.g., registers and FIFO, a processor executing a set of firmware instructions, any conventional programmable software module and a processor, or any combination thereof. The processor may advantageously be a microprocessor, but in the alternative, the processor may be any conventional processor, controller, microcontroller, or state machine. The software module could reside in RAM memory, flash memory, ROM memory, registers, hard disk, a removable disk, a CD-ROM, or any other form of storage medium known in the art. Those of skill would further appreciate that the data, instructions, commands, information, signals, bits, symbols, and chips that may be referenced throughout the above description are advantageously represented by voltages, currents, electromagnetic waves, magnetic fields or particles, optical fields or particles, or any combination thereof.

Preferred embodiments of the present invention have thus been shown and described. It would be apparent to one of ordinary skill in the art, however, that numerous alterations may be made to the embodiments herein disclosed without departing from the spirit or scope of the invention. Therefore, the present invention is not to be limited except in accordance with the following claims.

What is claimed is:

1. A method of optimizing radio-access-network-packet-data-service-node interface communications channel resources in a communications network when a mobile station moves from a first infrastructure element to a second infrastructure element associated with a packet data services node of the communications network, the method comprising the step of:

transmitting from the second infrastructure element associated with the packet data services node a message including a number of dormant network connections associated with the mobile station and a reduced list of identifiers associated with the dormant network connections, wherein the dormant network connections are connections that are not being used to transmit traffic channel data.

2. The method of claim 1, wherein said reduced list does not include Service Request Identifiers.

3. A method of optimizing the Air Interface traffic channel resources in a communications network when a mobile station moves from a first infrastructure element of a packet data services network to a second infrastructure element of the packet data services network, the method comprising the step of:

transmitting from the mobile station a message including a number of dormant network connections associated with the mobile station and enhanced information associated with the dormant network connections when the mobile station moves from a first infrastructure element of the packet data services network to a second infrastructure element, wherein the dormant network connections are connections that are not being used to transmit traffic channel data.

4. The method of claim 3, wherein said enhanced information includes packet zone identification information.

5. The method of claim 3, wherein said enhanced information is used to conserve traffic channel resources by reducing Point to Point Protocol session negotiation.

6. The method of claim 3, wherein said enhanced information is used to conserve traffic channel resources by educing Mobile Internet Protocol registration.

7. A mobile station configured to inform a packet data services network of dormant network connections associated with the mobile station when the mobile station moves from a first infrastructure element of the packet data services network to a second infrastructure element of the packet data services network, the mobile station comprising:
   an antenna;
   a processor coupled to the antenna; and
   a processor-readable medium accessible by the processor and containing a set of instructions executable by the processor to modulate and transmit from the mobile station a message including a number of dormant network connections associated with the mobile station and a reduced list of identifiers associated with the dormant network connections when the mobile station moves from the first infrastructure element of the packet data services network to the second infrastructure element, wherein the dormant network connections are connections that are not being used to transmit traffic channel data.

8. The mobile station of claim 7, wherein the dormant network connections comprise point-to-point protocol connections.

9. The mobile station of claim 7, wherein the first and second infrastructure elements comprise packet data service nodes.

10. The mobile station of claim 7, wherein the identifiers are not comprised of service reference identifiers.

11. The mobile station of claim 7, wherein the message comprises an origination message including an indicator that the dormant network connections are dormant.

12. The mobile station of claim 7, wherein the message comprises packet zone identification information.

13. A mobile station configured to inform a packet data services network of dormant network connections associated with the mobile station when the mobile station moves from a first infrastructure element of the packet data services network to a second infrastructure element of the packet data services network, the mobile station comprising:
   a device configured to transmit from the mobile station a message including a number of dormant network connections associated with the mobile station and a reduced list of identifiers associated with the dormant network connections when the mobile station moves from the first infrastructure element of the packet data services network to the second infrastructure element, wherein the dormant network connections are connections that are not being used to transmit traffic channel data.

14. The mobile station of claim 13, wherein the dormant network connections comprise point-to-point protocol connections.

15. The mobile station of claim 13, wherein the first and second infrastructure elements comprise packet data service nodes.

16. The mobile station of claim 13, wherein the identifiers are not comprised of service reference identifiers.

17. The mobile station of claim 13, wherein the message comprises an origination message including an indicator that the dormant network connections are dormant.

18. The mobile station of claim 13, wherein the message comprises packet zone identification information.

19. A mobile station configured to inform a packet data services network of dormant network connections associated with the mobile station when the mobile station moves from a first infrastructure element of the packet data services network to a second infrastructure element of the packet data services network, the mobile station comprising:
   means for transmitting from the mobile station a message including a number of dormant network connections associated with the mobile station and a reduced list of identifiers associated with the dormant network connections when the mobile station moves from the first infrastructure element of the packet data services network to the second infrastructure element, wherein the dormant network connections are connections that are not being used to transmit traffic channel data.

20. The mobile station of claim 19, wherein the dormant network connections comprise point-to-point protocol connections.

21. The mobile station of claim 19, wherein the fist and second infrastructure elements comprise packet data service nodes.

22. The mobile station of claim 19, wherein the identifiers are not comprised of service reference identifiers.

23. The mobile station of claim 19, wherein the message comprises an origination message including an indicator that the dormant network connections are dormant.

24. The mobile station of claim 19, wherein the message comprises packet zone identification information.

* * * * *